May 1, 1945. S. C. CORONITI ET AL 2,375,084
LIQUID LEVEL MEASURING APPARATUS
Filed June 23, 1943 4 Sheets-Sheet 1
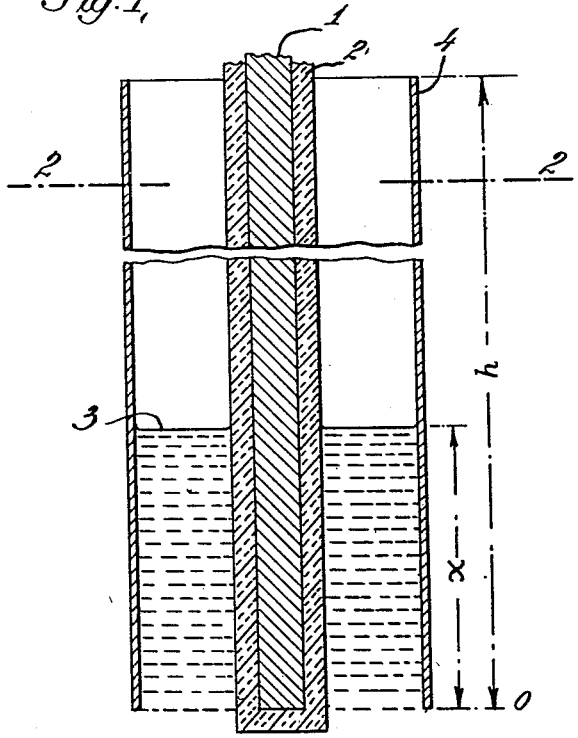
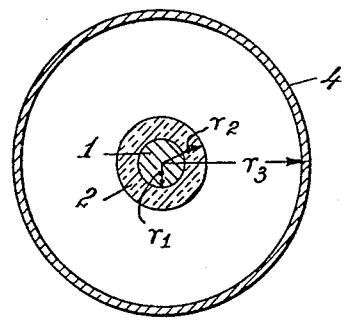
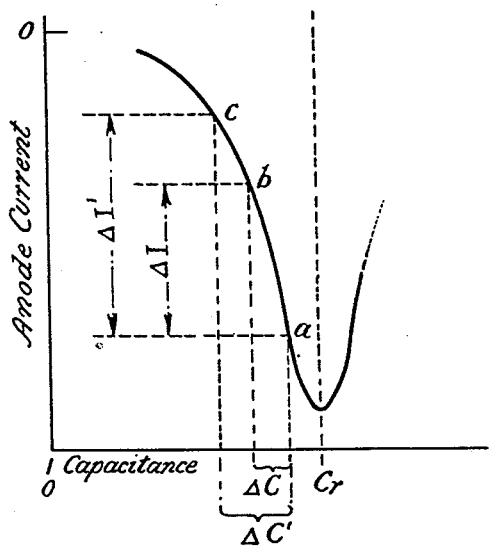
INVENTORS
Samuel C. Coroniti
Willy A. Schmidt
BY Henry W. Coughlin
ATTORNEY

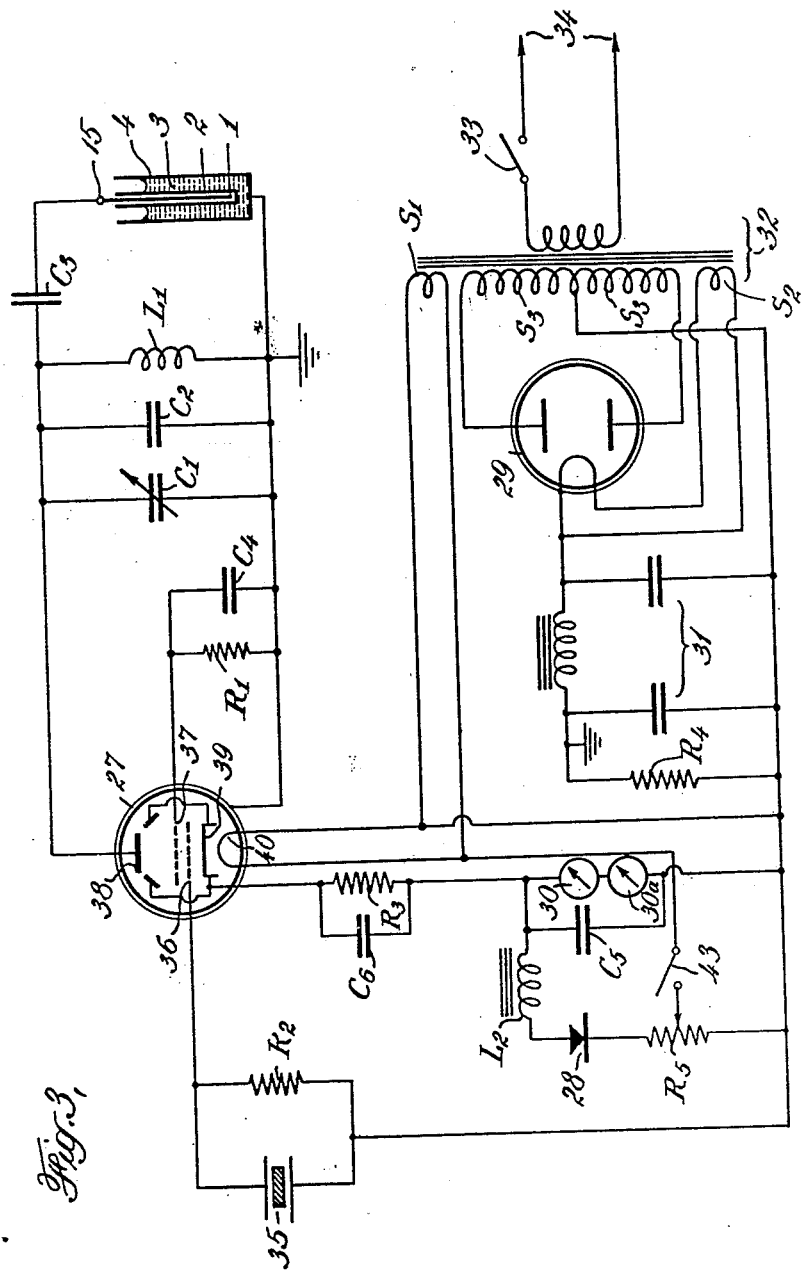

May 1, 1945.  S. C. CORONITI ET AL  2,375,084
LIQUID LEVEL MEASURING APPARATUS
Filed June 23, 1943  4 Sheets-Sheet 3
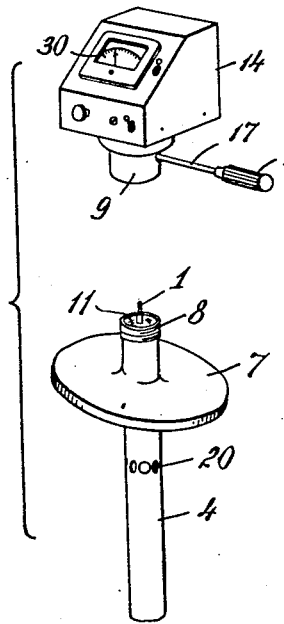
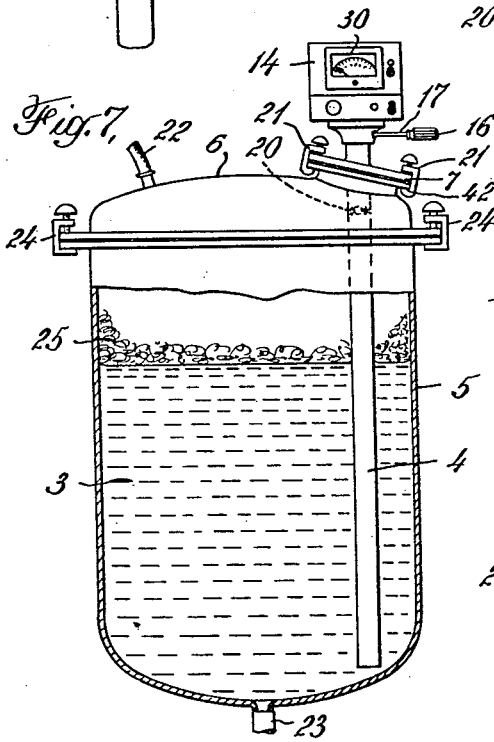
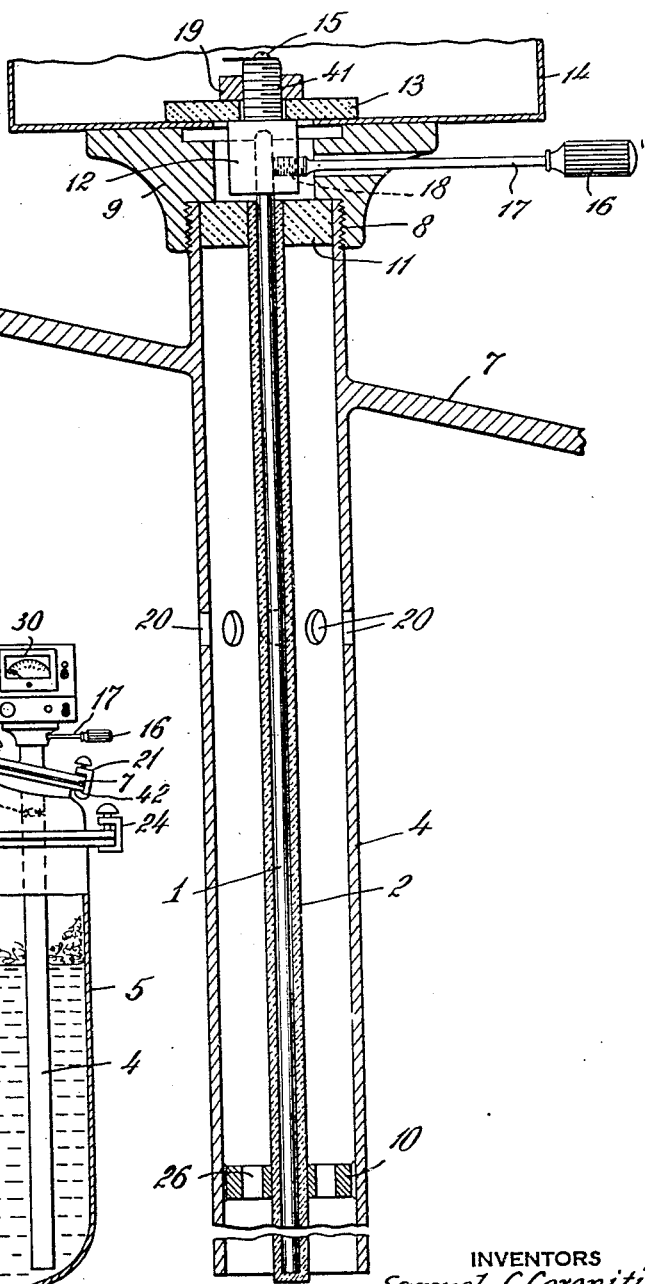

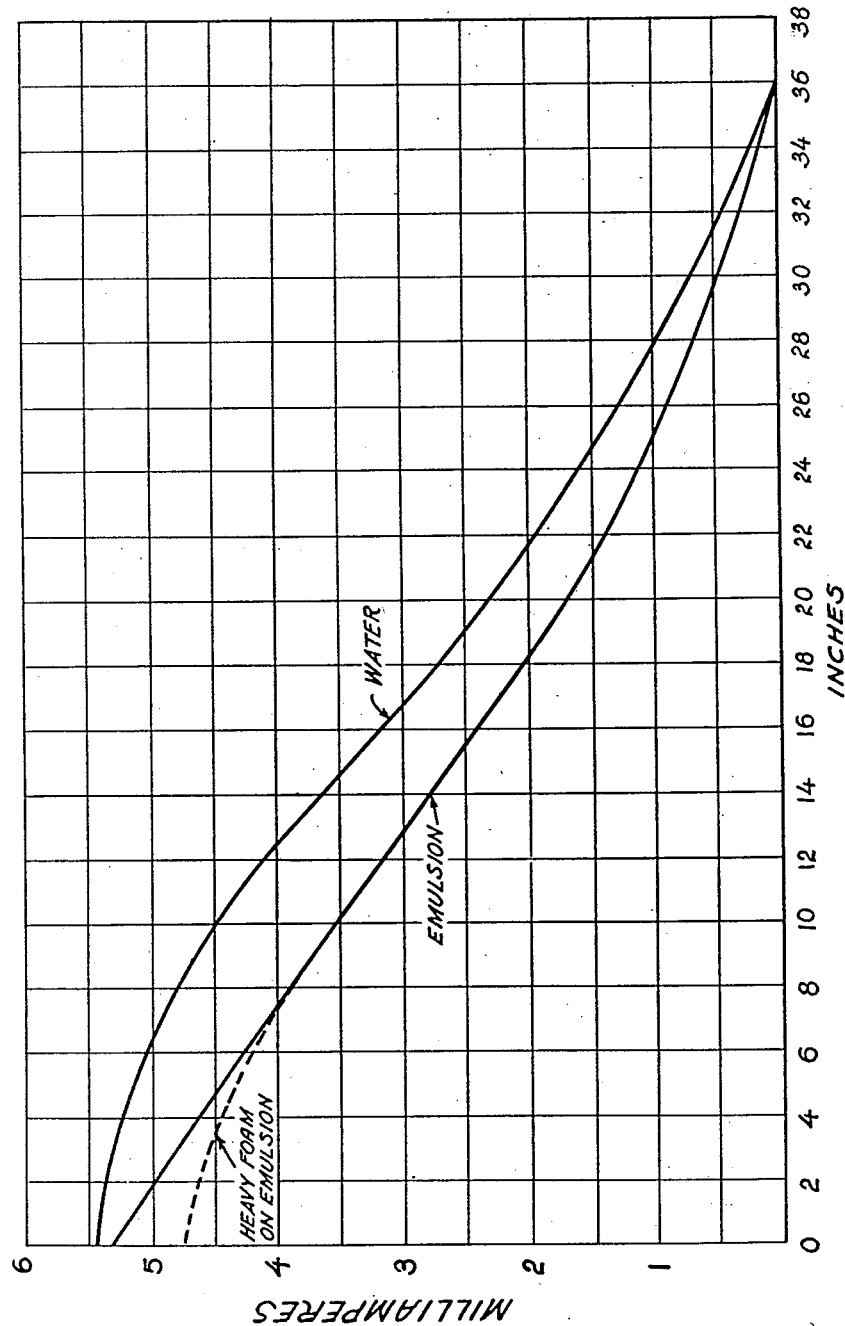

Patented May 1, 1945

UNITED STATES PATENT OFFICE 2,375,084

LIQUID LEVEL MEASURING APPARATUS

Samuel C. Coroniti, Cambridge, Mass., and Willy A. Schmidt, Easton, Pa., assignors to General Aniline & Film Corporation, New York, N. Y., a corporation of Delaware Application June 23, 1943, Serial No. 491,878

8 Claims. (Cl. 73—304)

This invention relates to the measurement and indication of liquid levels, and especially to apparatus for making such measurements and indications electrically.

The invention is based on the well-known principle that the capacitance of an electrostatic condenser varies in proportion to the change in area of the dielectric between the condenser plates. The apparatus in accordance with the invention makes possible the continuous indication to a high degree of accuracy of the level of liquids and solutions of a wide range of physical and electrical characteristics, as well as minimum and maximum levels thereof.

In accordance with the invention the change in the height of the liquid to be measured is caused to vary the effective area of the dielectric separating the condenser plates, thus to vary the effective capacitance of the condenser. This variation in capacitance in turn is caused preferably to vary the anode current of a thermionic oscillator circuit of which the frequency is held constant; and the magnitude of the current may be measured or indicated directly in units of liquid height or level.

The improved apparatus in accordance with this invention introduces several important advantages which will be more apparent from consideration of the following description of a preferred embodiment. Among these advantages may here be mentioned:

(1) The continuous indication of liquid level over a very large range;

(2) Instantaneous response to change of level;

(3) An accuracy of measurement to $\frac{1}{50}$ of an inch, or to greater accuracy if required;

(4) Response to liquids of a wide variety of dielectric constants and viscosities; and (5) A simple self-contained unit which may include the indicating device in the same structure, or if preferred the indicating device or a duplicate thereof may be installed at a remote point.

The invention will best be understood by reference to the drawings wherein:

Fig. 1 is a magnified view in vertical cross-section of a liquid level measuring device of the present invention;

Fig. 2 is a cross-section of the structure of Fig. 1, taken along the line 2—2 of Fig. 1;

Fig. 3 is a circuit diagram of the apparatus in accordance with the invention;

Fig. 4 is a curve of anode current plotted against change of capacitance of the oscillator circuit of the invention;

Fig. 5 is a perspective view of the apparatus of the invention separated into its two principal component parts;

Fig. 6 is an enlarged cross-sectional view of part of the structure of Fig. 5;

Fig. 7 shows the apparatus in accordance with the invention installed in a vat; and Fig. 8 represents typical response curves plotted from readings of the indicator of the apparatus as employed in measuring variations in level of different liquids.

In order accurately to indicate changes in liquid level the invention contemplates immersing in the liquid an electrostatic condenser structure preferably cylindrical in form, although it is not essential that the plates be cylindrical as long as the shape of the condenser plates is such that the change in liquid level effects a proportionate variation in the dielectric between the condenser plates. Accordingly, it is preferable that the plates comprise concentric, circular cylinders as shown in Figs. 1 and 2. The electrodes or plates of the condenser proper comprise a straight rod 1 and a straight circular cylinder 4 concentric therewith. Both of these electrodes should, of course, be of electric conducting material, and for use in most solutions may suitably be of stainless steel. However, in the preferred construction the rod 1 is not exposed to contact with the liquids or solutions to be measured, so it may be of any convenient conducting material.

Rod 1 is preferably enclosed in a thin tube 2 of insulating material, such as glass, hard rubber or polystyrene closed across the bottom as illustrated in Fig. 1 so that the liquid is kept out of contact with the rod. It can be shown that in accordance with well-known electrical laws the change of electrostatic capacity between electrodes 1 and 4 resulting from a change in the depth of liquid 3 from $x$ to $h$ is proportional to $h-x$. It can also be shown that the absolute electrostatic capacity will depend upon the dielectric constants of all materials, including the liquid, between the electrodes, as well as upon the area of the effective dielectric, i. e., the depth of the liquid, but this fact is usually of no consequence because in any given case it is only the change in capacitance and not the actual capacitance value which is important. However, it is of considerable practical importance that the apparatus be capable of measuring liquids of a wide range of dielectric constants. For example, it is often desired to measure the level of semi-conducting solutions such as water, acids and salts, as well as of liquids which are non-conducting such as oils. The dielectric constant of a semi-conducting solution is much greater than that of a non-conducting solution, from which it follows that the capacitance per unit of length of a coaxial cylindrical condenser having a semi-conducting solution between the electrodes is much greater than the capacitance of the same condenser having a non-conducting solution between the electrodes.

It is difficult to design a single electric circuit to give satisfactory response when the range of capacitance to be measured may be either small or large. In accordance with the present invention this difficulty is largely obviated by employing as a part of the entire dielectric, a material of low dielectric constant, whereby the effective capacitance of the condenser is chiefly governed by the dielectric constant of this material rather than by the dielectric constant of the liquid which forms the remaining part of the entire dielectric of the condenser. To achieve this ideal completely, $r_2$ should equal $r_1$ (Fig. 2) which, of course, is impossible if dielectric 2 has any sensible thickness. However, the desired result can be approximated if $(r_2-r_1)$ is made much smaller than $r_1$. The thickness of dielectric 2 $(r_2-r_1)$ can be made very small by coating the metal rod 1 with a thin film, preferably of resin plastic such as polystyrene. It is impracticable to use an extremely thin coating of insulating material 2 because it may deteriorate with repeated use or be injured by abrasion. Consequently, for practical purposes the wall thickness of material 2, viz., $(r_2-r_1)$, should be at least sufficient to withstand routine handling. When the thickness of material 2 is increased one practical disadvantage results: At least in the case of certain viscous liquids, the substance tends to cling to the exterior wall of insulating tubing 2 and also to the interior wall of metallic tubing 4 with the result that the dimensions $r_2$ and $r_3$ will be changed, and this in turn changes the rate of change of total capacitance of the condenser with change of liquid level. Experimental tests show that the most accurate results in measuring the heights of viscous liquids are achieved when $r_2$ is small compared to $r_3$.

In accordance with the invention, a condenser of construction later to be described is preferably connected in an oscillator circuit by means of which variations in the liquid level may be indicated or recorded. A circuit which has been found satisfactory for this purpose is illustrated in Fig. 3. Referring to Fig. 3, it will be seen that the circuit consists of an oscillator having a shunt feed parallel impedance comprising inductance and capacitance in the anode circuit. If, in such an oscillator, the frequency is held constant, variation of the anode circuit impedance will result in a variation of anode current, as is shown in Fig. 4. The oscillator includes an oscillator tube 27, preferably of a type having a reasonably large output such as a type 6L6. This type of tube is enclosed in a metal shell which can be grounded, as shown, to increase the stability of the circuit. The anode circuit of this tube is parallel-tuned by a variable condenser $C_1$ connected in parallel with a fixed condenser $C_2$ and with inductance $L_1$. Connected across inductance $L_1$, is additional capacitance comprising condenser $C_3$ connected in series with condenser device 1—4. This device, is, as above described, effectively another condenser, the capacitance of which varies in accordance with the level of the liquid being measured. The capacitance of $C_2$ plus the adjusted capacitance of $C_1$ is selected to cooperate with the inductance $L_1$ to provide the required basic frequency of the anode circuit. The capacitance value of condenser $C_3$ (which may be an adjustable condenser if desired) should be selected to be such that the resultant series capacitance of $C_3$ and of device 4 tunes the circuit to produce a maximum change of anode current when the level of liquid 3 is varied from 0 to $h$ (Fig. 1).

In order to maintain the oscillator at a fixed frequency the grid circuit includes a crystal 35 connected between the control grid 36 and the cathode 39. Crystal 35 shunted by a suitable resistor $R_2$, was, in the embodiment illustrated, tuned to 100 k. c. Screen grid 37 of tube 27 is suitably biased to the proper potential by resistor $R_1$ shunted by condenser $C_4$, connected between that grid and ground as shown. In the return lead to cathode 39 is a biasing resistor $R_3$ shunted by condenser $C_6$. Likewise connected in the return lead to the cathode is a suitable indicating device 30, here represented as a milliammeter having a range of 0 to 10 milliamperes. This meter registers the oscillating or anode current because this current flows through the cathode. The changes in this current serve to indicate changes in liquid level of device 4. This meter may be calibrated directly in units, such as inches, of liquid depth. If desired, more than one meter, as represented by device 30a, may be suitably connected in this circuit so that the indications may be observed at a remote point and at more than one point, if required.

The meter or indicating device 30 (or meters 30, 30a) would normally respond to the direct anode current initially or normally flowing in the anode circuit; but it is desirable that this current should not affect the meter. Therefore this direct current is balanced out by an equal and opposite direct current furnished by a rectifier circuit. Here such a rectifier circuit is shown to comprise a rectifier 28 of the copper oxide type connected in series with an adjustable resistor $R_5$ and the alternating-current source $S_1$. Also connected in the rectifier circuit is a filter comprising choke coil $L_2$ and condenser $C_5$ of suitable values to filter pulsating rectified current in order to obtain a substantially uniform direct current to apply across meter 30. By adjusting resistor $R_5$ the direct anode current may be exactly compensated, thus enabling the use of a more sensitive indicating meter, and thereby making possible more accurate readings of the liquid level changes.

The remaining apparatus shown in Fig. 3 comprises a suitable source of alternating current and direct current by which the oscillator is operated. This comprises a power transformer 32, supplied from a suitable alternating-current power source 34 through a control switch 33. The main secondary $S_3$ of the power transformer furnishes current at a suitable potential to full-wave rectifier tube 29, the output of which is filtered by filter elements 31. Tube 29 may be of type 80. The output direct-current potential appears across resistor $R_4$. Secondary windings $S_1$ and $S_2$ of power transformer 32 furnish the filament-heating currents for oscillator tube 27 and rectifier tube 29, respectively.

By way of example, and not as a limitation, the following magnitudes of circuit elements of the apparatus of Fig. 3 are here suggested as having been found satisfactory in one embodiment of the invention:

| | | | |
|---|---|---|---|
| $C_1$ | 200 mmf. (var.) | $R_1$ | .25 meg. |
| $C_2$ | .00075 mf. | $R_2$ | 5 meg. |
| $C_3$ | .00025 mf. | $R_3$ | 500 ohms |
| $C_4$ | .25 mf. | $R_4$ | 20,000 ohms |
| $C_5$ | 10 mf. | $R_5$ | 5,000 ohms (var.) |
| $C_6$ | 25 mf. | $L_1$ | 2.5 mh., 16 ohms |

In designing the oscillator circuit of Fig. 3 it should be kept in mind that the response of anode current to small changes of capacitance in the oscillator circuit depends upon the frequency of the oscillator. The appropriate frequency can be chosen only after the designer has a knowledge of the maximum change of capacitance which is likely to be encountered in measuring the maximum depth of a given liquid. If the chosen frequency for the oscillator is too low the resonance curve will not be sharp and the sensitivity will be decreased. For the purposes herein described an oscillator of 100 kilocycles was found to be a satisfactory compromise. The parallel-tuned oscillator circuit must accordingly be designed so that the maximum change of capacitance tunes only on one side of the resonance curve, as in Fig. 4. If a linear response is desired the maximum change of capacitance should be made to follow along the straightest portion of the curve.

In a crystal oscillator of the type shown in Fig. 3 the resonance curve (Fig. 4) is not symmetrical about the axis Cr. As the capacitance is gradually increased from minimum value the anode current decreases slightly at first and then more and more rapidly until the minimum value is reached, and as the capacitance is further increased the anode current increases sharply. It will usually be found that the oscillator operates more satisfactorily on one side of the curve than on the other.

The construction of the level-measuring unit, here described by way of example, part of which is immersed in the liquid of which the level is to be indicated, is illustrated in Figs. 5 and 6. This device comprises two main parts as shown in Fig. 5, the lower part being the condenser portion and the upper part being the capacitance measuring portion. These two portions may be firmly attached together to form a unitary structure which is completely self-contained.

The construction of the condenser portion of the measuring unit is shown in more detail in Fig. 6, from which it is seen to comprise a central rod or condenser electrode 1 and an outer straight cylindrical tube 4 as previously described. In the particular embodiment herein described by way of example, the radius of the rod electrode 1 is .0625". Surrounding this electrode is a polystyrene tube having a wall thickness of .1875". The inside diameter of tubing 4 is 1.44", the wall thickness $\frac{1}{16}$", and the length about 45". Thus the thickness ($r_3-r_2$ in Fig. 2) of the layer of liquid is .47". It will be noted that these dimensions do not strictly follow the preferred rule stated above that ($r_2-r_1$) be less than $r_1$. The suggested thickness of the dielectric coating ($r_2-r_1$) is, in this example, greater than provided by the rule in order the better to withstand abrasion, as is also mentioned above. Even under these conditions the accuracy of measurement should be adequate, especially if the liquid to be measured is of low viscosity. The length of the rod 1 should be a little more than 45" because it preferably should extend above the tubing 4 for the purpose of making connection with the upper portion, as shown in Figs. 5 and 6. It is also preferable that the insulating tubing 2 be closed at the bottom end, as shown in Fig. 6, to seal the rod 1 so as to be out of contact with the liquid 3 (Figs. 1, 3 and 7) to be measured. Polystyrene is preferred for tubing 2 because it has low liquid absorption, low power loss, high resistivity, and is chemically unaffected by most liquids.

In order to retain coaxial alignment of electrodes 1 and 4, a suitable number of insulating spacers 10, preferably also of polystyrene, may be spaced along the length of rod electrode 1 at suitable intervals. These spacers, which should fit loosely in tube 4, may be perforated with holes 26 to allow the flow of the liquid within the condenser. At the upper end of the condenser structure is a tightly fitting spacer and washer 11 of polystyrene which hermetically seals the top of the condenser structure. Suitable threads 8 may be formed at the upper end of tube 4, as shown, so that the condenser portion per se may be secured to the upper or capacitance measuring portion, to form a self-contained, sealed, unit structure.

The upper or capacitance measuring portion is shown in Fig. 5 to comprise chassis box 14, preferably of metal, and enclosing all of the measuring apparatus, including the electrical circuit elements represented in Fig. 3, together with the necessary switches and controls which may be manipulated from the outside of box 14. Meter 30 is mounted with its face visible from the outside. Receptacle 9 fastened to the bottom of chassis box 14 contains suitable threads cooperating with threads 8 on the condenser tube. Located in a central opening in receptacle 9 is a metal coupling piece 12 which has a central hole shaped to accommodate the terminal portion of rod 1. A threaded hole through the side of coupling 12 accommodates a contactor screw 18 (Fig. 6) which is secured to one end of a driver shank 17 of insulating material. At the other end of this shank 17 a handle 16, also of insulating material, is attached so that the contactor set screw 18 may be tightened or loosened readily when the condenser unit portions are assembled or disassembled. Coupling 12 is secured to chassis box 14 by means of a threaded metal stud 41 integral with coupling 12 which passes through a clearance hole in the bottom of the box. A nut 19 screwed down upon a polystyrene insulator ring 13 retains the coupler in position and insulates it from the chassis box 14. A terminal screw 15 is shown in the end of stud 41 for making electrical connection to the condenser electrode 1 which is at the high-potential side of the oscillator tank circuit as compared with the tube 4 which is grounded. Thus by loosening set screw 18 and unscrewing the condenser unit at the threads 8, this unit may be mechanically and electrically detached simultaneously from the chassis 14 and apparatus enclosed therein, or by the converse procedure may be attached by a single operation.

The complete condenser unit structure is shown in Fig. 7 assembled and mounted in a vat suitable for holding various liquids, of which it is required to have a continuous indication of the level in the vat. The vat 5 is furnished with an inlet pipe 22 and an outlet pipe 23, and is fitted with a cover 6 which may or may not be hermetically sealed to close the vat by suitable clamps 24. The cover being in this case dome-shaped makes it necessary that the condenser structure 1—4 carry a cover-plate 7 which may be welded thereto at a suitable angle. This plate may be made flat to fit against a cooperating flat ring 42 welded around a hole in the cover. By placing a suitable washer or gasket between cover-plate 7 and ring 42 the two may be hermetically sealed together by clamps 21. Thus merely by loosening clamps 21, the entire measuring unit may be removed from the tank for cleaning or other purposes. If the device is to be cleaned it need merely be removed, as just described, after which contact or set screw 18 is loosened and the two portions unscrewed at threads 8, thereby simultaneously detaching the portions electrically and mechanically in one operation. The lower or condenser portion may then readily be rinsed out without damaging the electrical apparatus in the upper or measuring portion.

It is advisable that suitable holes 20 be bored through the wall of condenser tube 4 beneath the cover-plate 7 and well above the maximum liquid level line. These holes are for the purpose of equalizing the pressure above the liquid line within the tube 4 to assure that the liquid level is the same inside and outside of tube 4, and they are also useful when the condenser structure is being cleansed.

In Fig. 7 foam 25 is indicated above the surface of the liquid 3. Such foam occasionally is present especially in tanks of emulsions. The effect of foam will be mentioned in connection with Fig. 8.

Adjustment and operation

The adjustment of the apparatus may be carried out as follows: With the liquid at some preselected high level point such as 36 inches from the bottom of the condenser tube 4, switch 43 is opened and variable condenser $C_1$ (Fig. 3) is tuned to some setting which may be represented, for example, by point $a$ on the anode current curve (Fig. 4). This point $a$ may correspond to an anode current of, say, 6 milliamperes as indicated on meter 30. This anode current is now balanced out by closing switch 43 and adjusting variable resistor $R_5$ until meter 30 reads zero. Thereafter as the level of the liquid is reduced towards zero the capacitance of the cylindrical condenser is correspondingly reduced. The electrical effect of this reduction of capacitance in the circuit of Fig. 3 is that the tuned circuit comprising inductance $L_1$ and all of the capacity in parallel therewith becomes detuned to, say, point $b$ on the curve (Fig. 4) which corresponds to say 5.5 milliamperes, causing a change in anode current of $\Delta I$.

The curves of Fig. 8 represent typical response of the indicator 30 plotted against change in liquid level from 0 to 36 inches. The upper curve labeled "Water" is more rounded than curves for gelatin solutions or emulsions, for example. The dielectric constant of water being about 84, the maximum change of capacitance when water is used is quite large. Therefore, when the level of water is to be measured the capacitance of condenser $C_1$ of Fig. 3 should be reduced so that the skirt part of the resonance curve (Fig. 4) is used. This means that the variation of capacitance ($\Delta C'$) of the tuned circuit due to decrease in liquid level will be between points $a$ and $c$ or even beyond point $c$.

When a liquid more viscous than water, such as a gelatin solution or emulsion, is used, the dielectric constant is less, and the shape of the curve is more nearly straight, as is shown in the lower curve in Fig. 8. The effect of about 4 inches of heavy foam on the top of a certain emulsion (Fig. 7) is shown by the dotted portion of the "Emulsion" curve, Fig. 8. From this it is seen that above a level of about 8 inches of liquid the foam had no effect on the level indication, but introduced an increasing error below 8 inches to zero level at which point the difference between the indicated reading and the true level of the liquid was 9.6%. Consequently, if the liquid is subject to foaming, this effect should be taken into account at very low levels.

The effect of change of viscosity on the shape of the curve has not been illustrated, but it may be described in connection with the "Water" curve of Fig. 8. A typical curve for low viscosity gelatin solutions, for example, might be almost parallel to the "Water" curve throughout but slightly lower than the "Water" curve. On the other hand, the curve of a high viscosity gelatin solution would be considerably straighter than the "Water" curve and lower throughout, terminating at 0 inches at about 4.4 milliamperes on the curve. The difference in readings between the solutions of different viscosities can be attributed to the formation of a layer of gelatin on the inside of the cylindrical electrode 4, and also on the exterior surface of the polystyrene tubing 2. Measurements made when the vat is repeatedly filled and emptied may show successively decreased readings of the meter, but such error can be avoided by cleaning the condenser structure 1, 2, 4, of the gelatin coating after each emptying of the vat. Liquids of low dielectric constants such as gasolene, lubricating oils and alcohols result in a small capacitance change for a large change of liquid level, and in this case the initial adjustment of condenser $C_1$ would be such that almost the entire side of the resonance curve of Fig. 4 would be employed. If the curves, as in Fig. 8, are not sufficiently linear they may be made more linear by reducing the frequency of the oscillator by corresponding changes in the inductance and capacitance of the oscillator circuit, and, of course, by a corresponding change in the crystal 35. Greater linearity may also be had by increasing the ratio of the dimensions $r_3$ to $r_2$ of the condenser structure as shown in Fig. 2. It may here be pointed out, however, that there is one advantage in making the dimension $r_2$ fairly large with respect to dimension $r_3$. The resulting increase in capacitance of the condenser structure necessitates operating the oscillator at a lower frequency, from which it follows that the inductance and capacitance of the oscillator circuit (Fig. 3) must be made larger. In this case any error introduced by small accidental changes of inductance or of capacitance in parallel therewith, such as caused by temperature variations, will be reduced, as will also errors caused by small frequency drift of the oscillator from any other cause. Experience has shown that more accurate results have been obtained in measuring viscous liquids when the dimension $r_2$ is small in comparison to the dimension $r_3$. With the condenser structure and circuit as above described the level within any container, open or closed, of any liquid, electrically conducting or non-conducting, can be accurately and continuously measured.

What is claimed is:

1. In liquid-level measuring apparatus, a measuring unit comprising an electric condenser portion and a capacitance measuring portion, said condenser portion comprising two electrodes insulated ad spacially fixed with respect to each other and adapted to be immersed in a liquid the level of which is to be measured, said measuring portion comprising a chassis and electric elements supported on said chassis and connected in an electric system sensitive to changes in capacitance of said condenser portion, and unitary detachable coupling means for simultaneously coupling said portions together electrically and mechanically in a unitary structure.

2. In liquid-level measuring apparatus, a measuring unit comprising an electric condenser portion and a capacitance measuring portion, said condenser portion comprising two electrodes insulated and spacially fixed with respect to each other and adapted to be immersed in a liquid the level of which is to be measured, a thin walled tube of resin plastic insulating material of low dielectric constant enclosing one of said electrodes whereby to keep said liquid out of contact therewith and to make accurate the measurement of liquids of a wide range of dielectric constants, said measuring portion comprising a chassis and electric elements supported on said chassis and connected in an electric system senitive to changes in capacitance of said condenser portion, and unitary detachable coupling means for simultaneously coupling said portions together electrically and mechanically in a self-contained unitary structure.

3. In liquid-level measuring apparatus, a measuring unit comprising an electric condenser portion and a capacitance measuring portion, said condenser portion comprising a tubular electrode and a rod-like electrode centrally located therein, insulating spacers distributed along the axis of said rod-like electrode to retain it in coaxial alignment with said tubular electrode, apertures in said spacers to enhance flow of liquid along said electrodes, insulating means at one end of said tubular electrode sealing the end thereof with respect to said liquid and spacing said electrodes with respect to each other, an extension of said rod-like electrode passing through said means, said measuring portion comprising a chassis and electric elements supported on said chassis and connected in an electric system sensitive to changes in capacitance of said condenser portion, coupling means secured to said chassis for mechanically coupling said chassis to the sealed end of said tubular electrode and for electrically connecting said system to said tubular electrode, and coupling means within said first named coupling means adapted to make electric connection between said extension of said rod-like electrode and said system.

4. In liquid-level measuring apparatus, a measuring unit comprising an electric condenser portion and a capacitance measuring portion, said condenser portion comprising a tubular electrode and a rod-like electrode located therein, insulating spacers distributed along the axis of said rod-like electrode to retain it in fixed alignment with said tubular electrode, apertures in said spacers to enhance flow of liquid along said electrodes, insulating means at one end of said tubular electrode sealing the end thereof with respect to said liquid, an extension of said rod-like electrode passing through said means, supporting means attached to said tubular electrode near the sealed end thereof for supporting said apparatus on a liquid container, apertures through said tubular electrode above the maximum liquid level to enhance the free flow of liquid between said electrodes, said measuring portion comprising a conductive chassis and electric elements including a level-indicating device supported on said chassis and connected in an electric system sensitive to changes in capacitance of said condenser portion, coupling means secured to said chassis for mechanically and electrically coupling said chassis to the sealed end of said tubular electrode, and coupling means within said first named coupling means adapted to make electric contact with said extension of said rod-like electrode.

5. In liquid-level measuring apparatus, a measuring unit comprising an electric condenser portion and a capacitance measuring portion, said condenser portion comprising a tubular electrode and a rod-like electrode centrally located therein, insulating spacers distributed along the axis of said rod-like electrode to retain it in coaxial alignment with said tubular electrode, apertures in said spacers to enhance flow of liquid along said electrodes, insulating means at one end of said tubular electrode sealing the end thereof with respect to said liquid and spacing said electrodes with respect to each other, an extension of said rod-like electrode passing through said means, supporting means attached to said tubular electrode near the sealed end thereof for supporting said apparatus on a liquid container, apertures through said tubular electrode above the maximum liquid level to enhance the free flow of liquid between said electrodes, a thin coating of insulating material on the surface of said rod-like electrode to seal the same from contact with said liquid, said coating material being of lower dielectric constant than that of any liquid to be measured whereby to make accurate the measurement of liquids of a wide range of dielectric constants, said measuring portion comprising a chassis and electric elements including a level-indicating device supported on said chassis and connected in an electric system sensitive to changes in capacitance of said condenser portion, coupling means secured to said chassis for mechanically coupling said chassis and electrically connecting said system to the sealed end of said tubular electrode, and coupling means additional to said first named coupling means adapted to make electric connection between said extension of said rod-like electrode and said system.

6. In liquid-level measuring apparatus, an electric condenser adapted to be immersed in a liquid the level of which is to be measured, said condenser comprising a tubular electrode and a rod-like electrode located therein, at least one insulating spacer positioned between said electrodes to retain them in coaxial alignment, apertures in each said spacer to enhance flow of liquid along said electrodes, a thin coating of resin plastic insulating material on the surface of said rod-like electrode to seal the same from contact with said liquid, said coating material being of lower dielectric constant than that of any liquid to be measured whereby to make accurate the measurement of liquids of a wide range of dielectric constants, supporting means attached to said tubular electrode for supporting said condenser in a liquid container, insulating means at the top end of said tubular electrode serving to space said electrodes with respect to each other and to seal the same with respect to said liquid whereby to keep said liquid out of contact with said supporting means, and apertures through said tubular electrode located above the maximum liquid level to enhance the flow of liquid within said condenser.

7. In liquid-level measuring apparatus, an electric condenser adapted to be immersed in a liquid to be measured, said condenser comprising a round tubular electrode and a round rod-like electrode centrally located therein, at least one insulating spacer positioned between said electrodes to retain them in coaxial alignment, apertures in each said spacer to enhance flow of liquid along said electrodes, means at the top end of said tubular electrode sealing the same with respect to said liquid, an opening at the bottom end of said tubular electrode, and a sheath of insulating material on the surface of said rod-like electrode to seal the same from contact with said liquid, said material being of lower dielectric constant than that of any liquid to be measured, the radius of said rod-like electrode being considerably greater than the thickness of said sheath, and the radius of the inside surface of said tubular electrode being considerably greater than the radius of the outside surface of said sheath.

8. In liquid-level measuring apparatus, a measuring unit comprising an electric condenser portion and a capacitance measuring portion, said condenser portion comprising a tubular electrode and a rod-like electrode centrally located therein, insulating spacers distributed along the axis of said rod-like electrode to retain it in coaxial alignment with said tubular electrode, apertures in said spacers to enhance flow of liquid along said electrodes, insulating means at one end of said tubular electrode sealing the end thereof with respect to said liquid and spacing said electrodes with respect to each other, an extension of said rod-like electrode passing through said means, a cover-plate to which said tubular electrode is secured and by which said apparatus is supported, said plate being adapted to fit an opening in the cover of a liquid container, apertures through said tubular electrode above the maximum liquid level to enhance the free flow of liquid between said electrodes, a thin coating of insulating material on the surface of said rod-like electrode to seal the same from contact with said liquid, said coating material being of lower dielectric constant than that of any liquid to be measured whereby to make accurate the measurements of liquids of a wide range of dielectric constants, said measuring portion comprising a metallic chassis box and electric elements including a level-indicating device secured to said chassis box and connected in a self-contained electric system sensitive to changes in capacitance of said condenser portion, coupling means secured to said chassis box for mechanically coupling said chassis and electrically connecting said system to the sealed end of said tubular electrode, and coupling means within said first named coupling means adapted to make electric connection between said extension of said rod-like electrode and said system.

SAMUEL C. CORONITI.
WILLY A. SCHMIDT.